United States Patent [19]
Claret et al.

[11] Patent Number: 5,695,553
[45] Date of Patent: Dec. 9, 1997

[54] WAX-BASED EMULSIONS AND THEIR USE IN GYPSUM PRODUCTS

[75] Inventors: Thomas C. Claret, Highlands Ranch, Colo.; Wesley E. Church, Las Vegas, Nev.; Roy S. Hodgson, Mission Viejo, Calif.

[73] Assignee: Conoco Inc., Ponca City, Okla.

[21] Appl. No.: 694,570

[22] Filed: Aug. 9, 1996

Related U.S. Application Data

[60] Provisional application No. 60/002,986, Aug. 30, 1995.
[51] Int. Cl.⁶ .................................................. C04B 11/00
[52] U.S. Cl. .......................... 106/778; 106/271; 106/272; 106/2; 428/484; 428/703; 428/486; 156/39; 156/41; 208/20
[58] Field of Search .................................. 106/778, 776, 106/270, 271, 272; 208/20; 156/39, 41; 428/484, 486, 703

[56] References Cited

U.S. PATENT DOCUMENTS

| | | |
|---|---|---|
| 3,935,021 | 1/1976 | Greve et al. . |
| 4,042,409 | 8/1977 | Terada et al. . |
| 4,315,957 | 2/1982 | Hereth et al. .......................... 106/271 |
| 4,748,196 | 5/1988 | Kuroda et al. . |
| 5,098,943 | 3/1992 | Tagawa et al. . |
| 5,120,355 | 6/1992 | Imai . |
| 5,437,722 | 8/1995 | Borenstein . |

*Primary Examiner*—Michael Marcheschi

[57] ABSTRACT

A composition suitable for use in making water-resistant gypsum products is provided. The composition is an aqueous emulsion comprising water, a paraffinic hydrocarbon wax, a Montan wax, an alkali metal or ammonium hydroxide in an amount sufficient to at least partially saponify the Montan wax, an emulsifier and a dispersant.

13 Claims, No Drawings

WAX-BASED EMULSIONS AND THEIR USE IN GYPSUM PRODUCTS

BENEFIT OF PROVISIONAL APPLICATION

This application claims the benefit under 35 U.S.C. 119(e) of U.S. Provisional Application No. 60/002986, filed Aug. 30, 1995.

FIELD OF THE INVENTION

This invention relates to a composition suitable for use in making water-resistant gypsum products. In particular, this invention relates to an aqueous wax-based emulsion and its use in combination with gypsum to form gypsum compositions which are settable by hydration. Further, the invention relates to products formed from such settable gypsum compositions, e.g. panels and boards, and a method for the manufacture of such products.

DESCRIPTION OF THE PRIOR ART

Gypsum is employed in panels or boards known as wallboard, a commonly used building material for a variety of structures. These gypsum products are produced by mixing anhydrous calcium sulfate or calcium sulfate hemihydrate with water and allowing the mixture to hydrate or set as calcium sulfate dihydrate, a relatively hard material. In the form of wallboard, there is a core panel of set gypsum sandwiched between a pair of liners made of paper or glass fiber although any type of sheet-like material could be used.

In many applications, wallboard is exposed to moisture and water which presents a problem in that set gypsum readily absorbs water and loses its strength. A variety of techniques have been used to render gypsum wallboard water-resistant or water-repellant.

U.S. Pat. No. 3,935,021 describes gypsum wallboard in which polyvinyl alcohol and asphalt-wax emulsion are incorporated into the gypsum. This technique suffers from the problem that the asphalt-wax emulsions are not always consistent in their efficiencies to impart water-resistance to the gypsum wallboard due to the variable nature of the asphalt. Thus, gypsum wallboard manufacturers must closely monitor usage levels on a lot-to-lot basis. An even more fundamental problem is the tendency of the asphalt-wax emulsions to separate on storage over time and form a surface crust which cannot be readily re-emulsified. This can lead to small particles or lumps of asphalt distributed throughout the gypsum that result in black spots on wallboard liners due to bleed-through from the gypsum core.

The problems associated with the asphalt-wax emulsions described in U.S. Pat. No. 3,935,021 are discussed in U.S. Pat. No. 5,437,722 together with a way to avoid such problems. Briefly, an aqueous emulsion suitable for the manufacture of water resistant wallboard is described which does not contain asphalt. In particular, the patentee discloses an aqueous emulsion which contains polyvinyl alcohol, paraffin wax and Montan wax, along with optional emulsifiers and stabilizers.

Other water repellent compositions useful in inparting water resistant properties to gypsum board but which do not contain asphalt are also disclosed in U.S. Pat. No. 4,042,409, U.S. Pat. No. 4,748,196, U.S. Pat. No. 5,098,943 and U.S. Pat. No. 5,120,355.

SUMMARY OF THE INVENTION

The present invention provides an alternative to the approaches described in aforementioned U.S. patents and, in particular, with respect to U.S. Pat. No. 5,437,722, the invention provides an aqueous wax emulsion for the manufacture of water-resistant gypsum products which does not contain polyvinyl alcohol yet essentially provides the same benefits.

In one aspect of the invention, there is provided an aqueous emulsion comprising water and (a) a paraffin hydrocarbon wax having a melting point in the range of about 100° F. to about 180° F. (about 38° C. to about 82° C.), (b) Montan wax having a melting point in the range of about 175° F. to about 190° F. (about 79° C. to about 88° C.) and an acid number greater than about 20, (c) an alkali metal or ammonium hydroxide, (c) an emulsifier, and (d) a dispersant. The Montan wax is used in an amount of about 0.5 to about 20 parts, by weight, per 100 parts of the paraffinic hydrocarbon wax, preferably about 5 to 15 parts by weight. The alkali metal or ammonium hydroxide is used in an amount sufficient to saponify the Montan wax. For KOH, this is normally at least about 0.1 part, by weight, per part of Montan wax. For NaOH, somewhat less is required, and for ammonium hydroxide, somewhat more is required. The actual amount required can be readily determined by those skilled in the art. The emulsifier is used in an amount sufficient to prevent the emulsion from inverting, normally about 0.2 to about 2 weight percent of the total emulsion is effective to prevent inversion. The dispersant is used in an amount sufficient to optimize the flow characteristics of the settable gypsum composition containing the emulsion when forming gypsum board yet avoiding undue increase in the set time of the gypsum composition. Normally, an amount of about 0.5 to about 2 weight percent of the total emulsion is used, preferably about 1 weight percent. Water generally will make up about 50 percent to 60 percent of the emulsion. It is desirable that the water be free of cations so that the emulsion will be stable for storage. Accordingly, when required, it may be advantageous to treat the water with a conventional deionizer before use.

In another aspect of the invention, there is provided a gypsum composition settable by hydration to form a water-resistant gypsum product comprising a mixture of 100 parts by weight of gypsum and about 1 to about 5 parts by weight of emulsion based on the gypsum, wherein the emulsion is as described above.

Further aspects of the invention include a water-resistant gypsum panel having a core sandwiched between a pair of liners wherein the core comprises the set gypsum composition of the invention and a method of manufacturing a water-resistant gypsum panel which involves forming a layer of the gypsum composition of the invention on a first liner, placing a second liner on the opposite surface of the layer from the first liner to from an assembly of the liners with the layer sandwiched therebetween, and drying the assembly while allowing hydration of the gypsum composition to form a panel.

DESCRIPTION OF PREFERRED EMBODIMENTS

The aqueous emulsion of the invention comprises water, a paraffinic hydrocarbon wax, Montan wax, an alkali metal hydroxide, an emulsifier and a dispersant.

The paraffin wax, generally a petroleum fraction wax, a synthetic wax, or a natural wax, has a melting point in the range of about 100° F. to about 180° F. (about 38° C. to about 82° C.), preferably about 130° F. to about 160° F. (about 54° C. to about 71° C.) and even more preferably about 145° F. to about 150° F. (about 63° C. to about 66° C.). In general, the higher the melting point of the paraffin wax, the more difficult it is to emulsify. Since some wallboard manufacturers use foaming agents in their manufacturing processes, it may also be desirable to use a paraffin wax that has a low oil content, for example, an oil content below about 1 wt. %, preferably below about 0.5 wt. %. Oil contents much above about 1 wt. % can cause serious problems with some foaming agents and, thus, by using paraffin waxes with low oil contents, such potential problems can be avoided. Examples of commercial paraffin waxes having oil contents below about 0.5 wt. % are CONOCO 730 wax and CHEVRON 140 and 142N waxes.

Montan wax is a well known naturally occurring wax and is generally obtained by solvent extraction of lignite. The specific Montan wax used in the invention has a melting point in the range of about 175° F. to about 190° F. (about 79° C. to about 88° C.) and an acid number greater than 20. The preferred Montan wax is supplied by Strohmeyer & Arpe Company which has a melting point of about 183° F. to about 190° F. (about 84° C. to about 88° C.) and an acid number greater than 20, typically in the range of the upper 20's to lower 30's. The higher the acid number, the easier it is to emulsify. The Montan wax is employed in an amount in the range of about 0.5 to about 20 parts, preferably about 5 to about 15 parts, by weight, per 100 parts of the paraffinic hydrocarbon wax.

While an alkali metal or ammonium hydroxide may be used in the invention, an alkali metal hydroxide is preferred. With regard to alkali metal hydroxides, KOH is preferred over NaOH since it appears to be more effective in reducing the particle size of the high melting point waxes. The alkali metal or ammonium hydroxide is used in an amount sufficient to saponify the Montan wax. Normally an amount of at least 0.1 part by weight per part of Montan wax will be sufficient but the necessary amount can be determined on a case by case basis once the particular Montan wax has been selected. For example, Strohmeyer & Arpe Company, a supplier of Montan wax, recommends the use of about 100 g of KOH per 1000 g of Montan wax.

The emulsifier is preferably poly(phenolate carboxylate) resin, a product sold under the tradename INDULIN ISE by Westvaco. In general, the emulsifier is used in an amount sufficient to prevent inversion of the emulsion. As the amount of Montan wax or the total wax solids used in the invention increases, the tendency of the emulsion to invert increases. Normally, an amount of about 0.2 to about 2 weight percent, preferably about 0.5 to about 1.5 weight percent, based on the total emulsion, is sufficient.

The dispersant is preferably an alkali metal salt of a lignosulfonic acid or an alkali metal salt of a heterogenous guaiacylopropane polyether. Preferably, the dispersant is the sodium salt of a lignosulfonic acid having the general formula corresponding to (Na)OCH3OAr)n(SO3Na)m and sold under the tradename POLYPON H by Westvaco or the sodium salt of a heterogenous guaiacyclopropane polyether having the general formula corresponding to (CH3O)(ONa)Ar(C3H4O) and sold under the tradename INDULIN C by Westvaco.

The emulsion can be prepared by melt blending the paraffinic hydrocarbon wax and the Montan wax followed by addition of water, KOH, INDULIN ISE and POLYPON H and continued mixing which results in the emulsion product. Total water content of the emulsion is normally about 50 percent to about 60 percent, by weight, of the emulsion. The blending and mixing can be accomplished in any well known manner, such as using a colloidal mill.

While the emulsion of the invention is an extremely stable emulsion and should not separate under normal conditions of storage. If separation does occur as a result of prolonged storage, it can be readily reformed by agitation. The emulsion can be used in the wallboard process at temperatures from about 80° F. to about 125° F. (about 27° C. to about 52° C.). Moreover, any equipment used in connection with making the emulsion or in its use to manufacture wallboard can be readily cleaned by simply rinsing with water and can be recycled back to the process.

In the manufacture of the gypsum compositions, an aqueous slurry of gypsum is formed and the aqueous emulsion is then added in proportions sufficient to provide about 1 percent to about 5 percent, preferably about 1.5 percent to about 2.5 percent, by weight of emulsion based on the gypsum. Other conventional ingredients such as foaming agents, set accelerators and the like may be included in the slurry as is understood in the art.

The resulting mixture is applied to a first liner to form a layer of the mixture on the liner and then a second liner is applied to the top of the layer thus forming an assembly with two outer liners having a layer of the gypsum slurry containing the aqueous emulsion sandwiched therebetween. The assembly is then subjected to drying conditions which removes excess water and causes hydration of the gypsum. A water resistant gypsum wallboard product results. It is mentioned that the liners can be of most any sheet-like material such as paper or fiber mat. Preferably the sheet-like material is a porous material.

The invention provides an aqueous wax-based emulsion which can be used in manufacturing water-resistant gypsum products on an effective cost-performance basis. It permits minimum use of wax-based emulsion to provide gypsum board having minimum water up-take characteristics.

EXAMPLE 1

An emulsion having the following formulation:

| | |
|---|---|
| Paraffin wax (CONOCO 730 Wax) MP 145–150 F. (63–66 C.) | 34.42 wt % |
| Montan wax (Strohmeyer & Arpe) MP 183–190 F. (84–88 C.) | 4.69 wt % |
| Water | 58.67 wt % |
| KOH | 0.47 wt % |
| INDULIN ISE | 0.49 wt % |
| Polyfon H | 1.26 wt % | is prepared by initially melt blending the paraffin wax and the Montan wax. The wax blend is then emulsified with the remaining ingredients in a colloidal mill.

The foregoing emulsion can be used in a gypsum slurry to manufacture wallboard typically using about 3 to 7 gallons of emulsion in a gypsum slurry sufficient to manufacture about 1000 ft. of wallboard in a typical wallboard manufacturing operation.

EXAMPLE 2

An emulsion having the following formulation:

| | |
|---|---|
| Paraffin wax (CONOCO 730 Wax) MP 145–150 F. (63–66 C.) | 34.42 wt % |
| Montan wax (Strohmeyer & Arpe) MP 183–190 F. (84–88 C.) | 4.69 wt % |
| Water | 58.67 wt % |
| KOH | 0.47 wt % |

-continued

| INDULIN ISE | 0.49 wt % |
|---|---|
| INDULIN C | 1.26 wt % | is prepared by initially melt blending the paraffin wax and the Montan wax. The wax blend is then emulsified with the remaining ingredients in a colloidal mill.

The foregoing emulsion can be used in a gypsum slurry to manufacture wallboard typically using about 3 to 7 gallons of emulsion in a gypsum slurry sufficient to manufacture about 1000 ft. of wallboard in a typical wallboard manufacturing operation.

Thus, having described the invention, it will be understood that certain variations and modifications may be made within the skill of the art without departing from the spirit and scope of the claims.

We claim:

1. An aqueous emulsion comprising water, a paraffinic hydrocarbon wax, a Montan wax, an alkali metal or ammonium hydroxide in an amount sufficient to at least partially saponify the Montan wax, an emulsifier and an effective dispersing amount of a dispersant selected from the group consisting of alkali metal salts of lignosulfonic acids and alkali metal salts of heterogenous guaiacylopropane polyethers.

2. A composition capable of being set by hydration into a water-resistant gypsum product comprising (a) gypsum and (b) the aqueous emulsion according to claim 1.

3. A water-resistant gypsum board having a core layer juxtapositioned between two outer liners wherein the core layer comprises the set composition according to claim 2.

4. An aqueous emulsion comprising water, a paraffinic hydrocarbon wax having a melting point in the range of about 100° F. to about 180° F., a Montan wax having a melting point in the range of about 175° F. to about 190° F., an alkali metal or ammonium hydroxide in an amount sufficient to at least partially saponify the Montan wax, an emulsifier and an effective dispersing amount of a dispersant selected from the group consisting of alkali metal salts of lignosulfonic acids and alkali metal salts of heterogeneous guatacylopropane polyethers.

5. An aqueous emulsion according to claim 4 wherein the Montan wax is present in an amount of about 0.5 to about 20 parts by weight per 100 parts by weight of the paraffinic hydrocarbon wax.

6. An aqueous emulsion according to claim 5 wherein the Montan wax is present in an amount of about 5 to about 15 parts by weight per 100 parts by weight of the paraffinic hydrocarbon wax.

7. An aqueous emulsion according to claim 5 wherein an alkali metal hydroxide is used to saponify the Montan wax in an amount of at least about 0.1 part by weight per part of Montan wax.

8. An aqueous emulsion according to claim 7 wherein the alkali metal hydroxide is KOH.

9. An aqueous emulsion according to claim 7 wherein the alkali metal hydroxide is NaOH.

10. A composition capable of being set by hydration into a water-resistant gypsum product comprising (a) gypsum and (b) an aqueous emulsion comprising water, a paraffinic hydrocarbon wax having a melting point in the range of about 100° F. to about 180° F., a Montan wax having a melting point in the range of about 175° F. to about 190° F. and is present in an amount of about 0.5 to about 20 parts by weight per 100 parts by weight of the paraffinic hydrocarbon wax, an alkali metal or ammonium hydroxide in an amount sufficient to at least partially saponify the Montan wax, an emulsifier and an effective dispersing amount of a dispersant selected from the group consisting of alkali metal salts of lignosulfonic acids and alkali metal salts of heterogenous guaiacylopropane polyethers.

11. A composition according to claim 10 wherein about 1 to about 5 parts by weight of the aqueous emulsion are present per 100 parts by weight of gypsum.

12. A water-resistant gypsum board comprising a core layer juxtapositioned between two outer liners wherein the core layer comprises the set composition according to claim 10.

13. A process for manufacturing a water-resistant gypsum board comprising forming an assembly by applying first and second liners to opposite surfaces of a core layer of the composition according to claim 10 followed by drying of the assembly under conditions which permit the composition to set through hydration.

* * * * *